US012445983B2

(12) United States Patent
Niu et al.

(10) Patent No.: US 12,445,983 B2
(45) Date of Patent: Oct. 14, 2025

(54) TIME CALIBRATION METHOD AND RELATED APPARATUS

(71) Applicant: Huawei Technologies Co., Ltd., Shenzhen (CN)

(72) Inventors: Le Niu, Nanjing (CN); Zixiang Ma, Nanjing (CN); Shuaishuai Zhang, Nanjing (CN); Chun Pan, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 384 days.

(21) Appl. No.: 17/963,348

(22) Filed: Oct. 11, 2022

(65) Prior Publication Data

US 2023/0111449 A1 Apr. 13, 2023

(30) Foreign Application Priority Data

Oct. 11, 2021 (CN) .......................... 202111180893.9
Dec. 2, 2021 (CN) .......................... 202111463298.6

(51) Int. Cl.
*H04W 56/00* (2009.01)
*H04W 84/12* (2009.01)

(52) U.S. Cl.
CPC .......... *H04W 56/001* (2013.01); *H04W 84/12* (2013.01)

(58) Field of Classification Search
None
See application file for complete search history.

(56) References Cited

U.S. PATENT DOCUMENTS

| 10,064,057 | B2 * | 8/2018 | Aldana | ................ H04W 12/04 |
| 10,148,412 | B1 * | 12/2018 | Chu | ........................ H04L 69/28 |
| 10,989,789 | B2 * | 4/2021 | Amin | ..................... H04W 8/005 |
| 2014/0314068 | A1 * | 10/2014 | Wentink | ................ H04W 56/00 370/350 |
| 2016/0262122 | A1 * | 9/2016 | Aldana | ................ H04W 24/10 |
| 2017/0127412 | A1 * | 5/2017 | Amizur | ................ G01S 13/765 |
| 2017/0257758 | A1 * | 9/2017 | Aldana | ................ H04W 64/00 |
| 2018/0249437 | A1 * | 8/2018 | Lindskog | ............. G01S 13/878 |
| 2020/0081091 | A1 * | 3/2020 | Amin | ................. G01S 5/02213 |
| 2022/0053441 | A1 * | 2/2022 | Seok | ....................... H04L 1/188 |

OTHER PUBLICATIONS

Geoffrey M. Garner, "IEEE 1588 Version 2", ISPCS, Sep. 24, 2008, 89 pages.

* cited by examiner

*Primary Examiner* — Hashim S Bhatti
*Assistant Examiner* — Ahemd Saifuddin
(74) *Attorney, Agent, or Firm* — Conley Rose, P.C.

(57) ABSTRACT

A time calibration method includes a first station receives a first frame from a second station; the first station stores a receiving moment of the first frame; the first station receives a second frame from the second station, where the second frame includes a sending moment at which the second station sends the first frame; and the first station obtains a clock offset between a first clock of the first station and a second clock of the second station based on the receiving moment of the first frame and the sending moment of the first frame.

20 Claims, 7 Drawing Sheets

TIME CALIBRATION METHOD AND RELATED APPARATUS

CROSS-REFERENCE TO RELATED APPLICATIONS

This application claims priority to Chinese Patent Application No. 202111180893.9, filed on Oct. 11, 2021, and Chinese Patent Application No. 202111463298.6, filed on Dec. 2, 2021. The aforementioned patent applications are hereby incorporated by reference in their entireties.

TECHNICAL FIELD

The present disclosure relates to the field of communication technologies, and in particular, to a time calibration method and a related apparatus.

BACKGROUND

In a wireless local area network (WLAN), a clock offset between stations (STAs) is calculated through fine timing measurement (FTM) to achieve time synchronization between the stations.

Time synchronization in an FTM mechanism is implemented by using an FTM session. An FTM session includes three parts: negotiation, ranging exchange, and termination. Specifically, in a negotiation phase, a transmit end needs to send an FTM request frame to initiate an FTM session, and after receiving the FTM request frame, a receive end returns an FTM frame to perform ranging exchange. After receiving the FTM frame, the transmit end returns an acknowledgment (ACK) frame. The transmit end and the receive end determine a clock offset and complete time synchronization based on sending moments and receiving moments of the frames.

However, in the FTM mechanism, the transmit end and the receive end need to exchange the frames in a one-to-one manner. This is time-consuming and has high air interface overheads.

SUMMARY

According to a first aspect, the present disclosure provides a time calibration method that includes: a first station receives a first frame from a second station; the first station stores a receiving moment of the first frame; the first station receives a second frame from the second station, where the second frame carries a sending moment at which the second station sends the first frame; and the first station obtains a clock offset between a clock of the first station and a clock of the second station based on the receiving moment of the first frame and the sending moment of the first frame that are stored by the first station.

Specifically, because the first station and the second station belong to different stations in a WLAN, and a distance between the different stations in the WLAN is short, a transmission delay generated between the different stations due to the distance is small. In other words, time of air interface transmission between the different stations can be ignored. Based on this, a time difference obtained by the first station by subtracting the sending moment of the first frame from the receiving moment of the first frame that are stored in the first station may be considered as the clock offset between the clock of the first station and the clock of the second station. Because a distance between the first station and the second station is short, time of air interface transmission between the two stations is very short. Therefore, the second frame sent by the second station does not need to carry the receiving moment of the first frame, and high time calibration precision can still be implemented. In addition, the second station sends the first frame and the second frame to the first station, so that the first station can obtain the clock offset between the clock of the first station and the clock of the second station through calculation. This effectively reduces air interface overheads.

With reference to the first aspect, in a possible implementation of the first aspect, the first station further stores a sequence number of the first frame.

With reference to the first aspect, in a possible implementation of the first aspect, the first station further stores an identifier of the second station in the first frame.

The identifier of the second station includes but is not limited to a service set identifier (SSID) of the second station, a media access control (MAC) address of the second station, a basic service set identifier (BSSID) of the second station, or the like.

With reference to the first aspect, in a possible implementation of the first aspect, the first station further stores a sequence number of the first frame and an identifier of the second station in the first frame.

With reference to the first aspect, in a possible implementation of the first aspect, that the second frame further carries a sequence number of the first frame further includes: The first station searches based on the sequence number of the first frame carried in the second frame, for the receiving moment of the first frame corresponding to the sequence number of the first frame.

Specifically, after the first station receives the second frame from the second station, the first station searches, based on the sequence number of the first frame carried in the second frame, for the receiving moment of the first frame corresponding to the sequence number of the first frame. After the first station finds the receiving moment of the first frame, the first station obtains the clock offset between the clock of the first station and the clock of the second station through calculation based on the receiving moment of the first frame and the sending moment of the first frame that are stored by the first station. For example, the first station calculates the clock offset between the clock of the first station and the clock of the second station based on the receiving moment (the receiving moment is stored when the first station receives the first frame) of the first frame and the sending moment (the sending moment is carried in the second frame) of the first frame that are stored by the first station.

Each time after receiving a frame, the first station stores a receiving moment of the frame and stores a sequence number corresponding to the receiving moment. After the first station receives the second frame, the first station locally searches, based on the sequence number of the first frame carried in the second frame, for a local sequence number (that is, a sequence number locally stored in the first station) that is the same as the sequence number. If the local sequence number exists, a receiving moment corresponding to the local sequence number is the receiving moment of the first frame.

For example, after the first station receives a frame 1, the first station records and stores a receiving moment "T1" of the frame 1 and a sequence number "1" of the frame 1. After the first station receives a frame 2, the frame 2 carries the sequence number "1" (that is, the sequence number of the frame 1). The first station searches for a local sequence number based on the sequence number "1" carried in the frame 2. After the first station finds that a same sequence number "1" exists locally, the first station determines that a receiving moment corresponding to the local sequence number "1" is the receiving moment of the frame 1.

With reference to the first aspect, in a possible implementation of the first aspect, the second frame further carries a sequence number of the second frame, and the method further includes: The first station subtracts one from the sequence number of the second frame to obtain the sequence number of the first frame, and searches for the receiving moment of the first frame corresponding to the sequence number of the first frame.

In this case, the second frame carries the sequence number corresponding to the second frame. In this implementation, after the first station receives the second frame from the second station, the first station obtains the sequence number of the second frame. The first station obtains the sequence number of the first frame by subtracting one from the sequence number of the second frame. Then, the first station searches for the corresponding receiving moment of the first frame based on the sequence number of the first frame. After the first station finds the receiving moment of the first frame, the first station obtains the clock offset between the clock of the first station and the clock of the second station through calculation based on the receiving moment of the first frame and the sending moment of the first frame that are stored by the first station. For example, the first station calculates the clock offset between the clock of the first station and the clock of the second station based on the receiving moment (the receiving moment is stored when the first station receives the first frame) of the first frame and the sending moment (the sending moment is carried in the second frame) of the first frame that are stored by the first station.

Specifically, each time after receiving a frame, the first station stores a receiving moment of the frame and stores a sequence number corresponding to the receiving moment. After the first station receives the second frame, the first station obtains the sequence number of the first frame by subtracting one from the sequence number of the second frame carried in the second frame. Then, the first station locally searches for whether a local sequence number (that is, a sequence number locally stored in the first station) that is the same as the sequence number exists. If the local sequence number exists, a receiving moment corresponding to the local sequence number is the receiving moment of the first frame.

For example, after the first station receives a frame 1, the first station records and stores a receiving moment "T1" of the frame 1 and a sequence number "1" of the frame 1. After the first station receives a frame 2, the frame 2 carries a sequence number "2" (that is, the sequence number of the frame 2). The first station obtains the sequence number "1" of the frame 1 by subtracting one from the sequence number "2" carried in the frame 2. The first station then searches for a local sequence number. After the first station finds that a same sequence number "1" exists locally, the first station determines that a receiving moment corresponding to the local sequence number "1" is the receiving moment of the frame 1.

It may be understood that, after receiving the second frame, the first station does not find the receiving moment corresponding to the first frame based on the sequence number of the first frame carried in the second frame or the sequence number of the first frame obtained by subtracting one from the sequence number of the second frame carried in the second frame. The first station considers that a frame loss occurs between the first frame and the second frame. For example, the first station receives a frame 5, and a sequence number carried in the frame 5 is "4" (that is, a sequence number of a frame 4). The first station searches, based on the sequence number "4" carried in the frame 5, for a receiving moment of the frame 4 corresponding to "4". When the receiving moment of the frame 4 corresponding to "4" is not found, the first station considers that a frame loss occurs in the frame 4. In other words, the first station fails to receive the frame 4.

With reference to the first aspect, in a possible implementation of the first aspect, the second station is an access point, and the first frame and the second frame are beacon frames. The first frame and the second frame may be beacon frames or newly defined management frames. A beacon frame may be a normal beacon frame or a short beacon frame. If this step is implemented by using a beacon frame, no additional management frame is required. In this way, air interface overheads are reduced. If a newly defined management frame is used, the frame can be sent more frequently to complete time calibration in a timelier manner.

In another implementation, the second station may be a non-AP station. It may be understood that the first station may be a non-AP station, or may be an access point.

With reference to the first aspect, in a possible implementation of the first aspect, the receiving moment of the first frame is a moment at which the first frame arrives at a physical layer component in the first station. It may be understood that the receiving moment of the first frame may be a moment at which the first frame arrives at an analog-to-digital converter of the first station, or the receiving moment of the first frame may be a moment at which the first frame arrives at an antenna port of the first station, or the like.

With reference to the first aspect, in a possible implementation of the first aspect, the receiving moment of the first frame is a moment at which a training field in a preamble of the first frame arrives at the physical layer component in the first station. The training field includes but is not limited to a short training field (STF) or a legacy-long training field (LTF). If a moment at which an LTF in the preamble arrives at the physical layer component (e.g., an analog-to-digital converter) is used as the receiving moment, precision of the receiving moment is high. The LTF may be a legacy-LTF (L-LTF), a high throughput-LTF (HT-LTF), a very high throughput-LTF (VHT-LTF), a high efficiency-LTF (HE-LTF), an extremely high-throughput-LTF (EHT-LTF), or the like.

With reference to the first aspect, in a possible implementation of the first aspect, that the first station obtains a clock offset between a clock of the first station and a clock of the second station based on the receiving moment of the first frame and the sending moment of the first frame that are stored by the first station includes: The first station obtains the clock offset between the clock of the first station and the clock of the second station through calculation based on a hardware time delay of the first station, the receiving moment of the first frame, and the sending moment of the first frame.

Further, a method for calibrating the foregoing calculated clock offset between the clock of the first station and the clock of the second station by the first station based on the hardware time delay is as follows: clock offset between the clock of the first station and the clock of the second station=receiving moment of the first frame—sending moment of the first frame—hardware time delay.

The first station may obtain the hardware time delay of the first station, and then calibrate the foregoing calculated clock offset between the clock of the first station and the clock of the second station based on the hardware time delay, to improve precision of the clock offset between the clocks of the first station and the second station.

With reference to the first aspect, in a possible implementation of the first aspect, the first frame and/or the second frame further include/includes first level information, and the first level information indicates a level of the second station. The method further includes: The first station obtains second level information, where the second level information indicates a level of the first station; when the level of the second station is higher than the level of the first station, the first station follows time of the second station based on the clock offset between the clock of the first station and the clock of the second station. In this way, each station follows a clock offset between a clock of the station and a clock of a station with a higher level, to ensure accuracy of the calculated clock offset between the clocks.

With reference to the first aspect, in a possible implementation of the first aspect, the sending moment of the first frame is located in a vendor-defined element of the second frame.

Specifically, the sending moment at which the second station sends the first frame may be carried in the vendor-defined element of the second frame, and the vendor-defined element may be a newly added private element in a beacon frame. The vendor-defined element includes an element identifier (ID), a length, and content. The content includes one or more of the following: level information, a timestamp, and a sequence number (SN). That is, a "timestamp field" in the vendor-defined element is used to carry the sending moment of the first frame. When the second frame carries the sequence number corresponding to the first frame, a "sequence number field" in the vendor-defined element is used to carry the sequence number corresponding to the first frame. When the second frame does not carry the sequence number corresponding to the first frame, but carries the sequence number corresponding to the second frame, a "sequence number field" in the vendor-defined element is used to carry the sequence number corresponding to the second frame.

According to a second aspect, the present disclosure proposes a communication apparatus. The communication apparatus is applied to a first station, and the communication apparatus includes: a transceiver module configured to receive a first frame from a second station; and a processing module configured to store a receiving moment of the first frame.

The transceiver module is further configured to receive a second frame from the second station, where the second frame carries a sending moment at which the second station sends the first frame.

The processing module is further configured to obtain a clock offset between a clock of the first station and a clock of the second station based on the receiving moment of the first frame and the sending moment of the first frame that are stored by the first station.

In a possible implementation, the processing module is further configured to store a sequence number of the first frame.

In a possible implementation, the processing module is further configured to store an identifier of the second station in the first frame.

In a possible implementation, the second frame further carries a sequence number of the first frame. The communication apparatus further includes:

The processing module is further configured to search, based on the sequence number of the first frame carried in the second frame, for the receiving moment of the first frame corresponding to the sequence number of the first frame.

In a possible implementation, the second frame further carries a sequence number of the second frame. The communication apparatus further includes:

The processing module is further configured to subtract one from the sequence number of the second frame to obtain the sequence number of the first frame, and search for the receiving moment of the first frame corresponding to the sequence number of the first frame.

In a possible implementation, the second station is an access point, and the first frame and the second frame are beacon frames.

In a possible implementation, the receiving moment of the first frame is a moment at which the first frame arrives at a physical layer component in the first station.

In a possible implementation, the receiving moment of the first frame is a moment at which a training field in a preamble of the first frame arrives at the physical layer component in the first station.

In a possible implementation, the processing module is further configured to obtain the clock offset between the clock of the first station and the clock of the second station through calculation based on a hardware time delay of the first station, the receiving moment of the first frame, and the sending moment of the first frame.

In a possible implementation, the first frame and/or the second frame further include/includes first level information, and the first level information indicates a level of the second station.

The transceiver module is further configured to obtain second level information, where the second-level information indicates a level of the first station.

The processing module is further configured to: when the level of the second station is higher than the level of the first station, follow time of the second station based on the clock offset between the clock of the first station and the clock of the second station.

In a possible implementation, the sending moment of the first frame is located in a vendor-defined element of the second frame.

According to a third aspect, the present disclosure proposes a communication apparatus. The communication apparatus is applied to a first station, and the communication apparatus includes: a transceiver configured to receive a first frame from a second station; and a processor configured to store a receiving moment of the first frame.

The transceiver is further configured to receive a second frame from the second station, where the second frame carries a sending moment at which the second station sends the first frame.

The processor is further configured to obtain a clock offset between a clock of the first station and a clock of the second station based on the receiving moment of the first frame and the sending moment of the first frame that are stored by the first station.

In a possible implementation, the processor is further configured to store a sequence number of the first frame.

In a possible implementation, the processor is further configured to store an identifier of the second station in the first frame.

In a possible implementation, the second frame further carries a sequence number of the first frame. The communication apparatus further includes:

The processor is further configured to search, based on the sequence number of the first frame carried in the second frame, for the receiving moment of the first frame corresponding to the sequence number of the first frame.

In a possible implementation, the second frame further carries a sequence number of the second frame. The communication apparatus further includes:

The processor is further configured to subtract one from the sequence number of the second frame to obtain the sequence number of the first frame, and search for the receiving moment of the first frame corresponding to the sequence number of the first frame.

In a possible implementation, the second station is an access point, and the first frame and the second frame are beacon frames.

In a possible implementation, the receiving moment of the first frame is a moment at which the first frame arrives at a physical layer component in the first station.

In a possible implementation, the receiving moment of the first frame is a moment at which a training field in a preamble of the first frame arrives at the physical layer component in the first station.

In a possible implementation, the processor is further configured to obtain the clock offset between the clock of the first station and the clock of the second station through calculation based on a hardware time delay of the first station, the receiving moment of the first frame, and the sending moment of the first frame.

In a possible implementation, the first frame and/or the second frame further include/includes first level information, and the first level information indicates a level of the second station.

The transceiver is further configured to obtain second level information, where the second-level information indicates a level of the first station.

The processor is further configured to: when the level of the second station is higher than the level of the first station, follow time of the second station based on the clock offset between the clock of the first station and the clock of the second station.

In a possible implementation, the sending moment of the first frame is located in a vendor-defined element of the second frame.

According to a fourth aspect, a communication apparatus is provided, to implement the foregoing method. The communication apparatus may be the first station in the first aspect, or an apparatus including the first station, or an apparatus included in the first station, for example, a system chip. The communication apparatus includes a corresponding module, unit, or means for implementing the foregoing method. The module, unit, or means may be implemented by using hardware or software, or implemented by using hardware by executing corresponding software. The hardware or the software includes one or more modules or units corresponding to the foregoing functions.

According to a fifth aspect, a communication apparatus is provided. The communication apparatus includes a processor and a memory. The memory is configured to store computer instructions. When the processor executes the instructions, the communication apparatus is enabled to perform the method according to any one of the foregoing aspects. The communication apparatus may be the first station in the first aspect, or an apparatus including the first station, or an apparatus included in the first station, for example, a system chip.

According to a sixth aspect, a communication apparatus is provided, including a processor. The processor is configured to: after being coupled to a memory and reading instructions in a memory, perform the method in any one of the foregoing aspects based on the instructions. The memory and the communication apparatus are independent of each other. The communication apparatus may be the first station in the first aspect, or an apparatus including the first station, or an apparatus included in the first station, for example, a system chip.

According to a seventh aspect, a computer-readable storage medium is provided. The computer-readable storage medium stores instructions. When the instructions are executed on a communication apparatus, the communication apparatus is enabled to perform the method according to any one of the foregoing aspects. The communication apparatus may be the first station in the first aspect, or an apparatus including the first station, or an apparatus included in the first station, for example, a system chip.

According to an eighth aspect, a computer program product including instructions is provided. When the instructions are run on a communication apparatus, the communication apparatus is enabled to perform the method according to any one of the foregoing aspects. The communication apparatus may be the first station in the first aspect, or an apparatus including the first station, or an apparatus included in the first station, for example, a system chip.

According to a ninth aspect, a communication apparatus is provided (e.g., the communication apparatus may be a chip or a chip system). The communication apparatus includes a processor configured to implement a function according to any one of the foregoing aspects. In a possible design, the communication apparatus further includes the memory, and the memory is configured to store program instructions and data. When the communication apparatus is a chip system, the communication apparatus may include a chip, or may include a chip and another discrete component.

According to a tenth aspect, a chip is provided. The chip includes a processor and a communication interface. The communication interface is configured to communicate with a module other than the shown chip. The processor is configured to run a computer program or instructions, so that an apparatus in which the chip is installed can perform the method according to any one of the foregoing aspects.

According to an eleventh aspect, a communication system is provided. The communication system includes the first station in the foregoing aspects and one or more APs.

According to a twelfth aspect, a communication system is provided. The communication system includes the first station in the foregoing aspects and one or more non-AP stations.

According to a thirteenth aspect, a communication system is provided. The communication system includes the first station in the foregoing aspects, one or more APs, and one or more non-AP stations.

DETAILED DESCRIPTION

The following describes embodiments of the present disclosure. It is clearly that described embodiments are merely some but not all of embodiments of the present disclosure. A person of ordinary skill in the art may learn that, as a new application scenario emerges, the technical solutions provided in embodiments of the present disclosure are also applicable to a similar technical problem.

In the specification, claims, and accompanying drawings of the present disclosure, the terms "first", "second", and so on are intended to distinguish between similar objects but do not necessarily indicate a specific order or sequence. It should be understood that the descriptions termed in such a manner are interchangeable in proper cases so that embodiments can be implemented in another order than the order illustrated or described in the present disclosure. Names or numbers of steps in the present disclosure do not mean that the steps in the method procedure need to be performed in a time/logical sequence indicated by the names or numbers. An execution order of the steps in the procedure that have been named or numbered can be changed based on a technical objective to be achieved, provided that same or similar technical effects can be achieved.

Embodiments of the present disclosure may be applied to a WLAN. Currently, a standard used in the WLAN is the Institute of Electrical and Electronics Engineers (IEEE) 802.11 family. The WLAN may include a plurality of basic service sets (BSSs). A network node in the basic service set is a station (STA). The station includes an access point (AP) and a non-access point station (non-AP STA). Each basic service set may include one AP and a plurality of non-AP STAs associated with the AP.

The access point is also referred to as a hotspot. The AP is a device used by a mobile user to access a wired network, and can be deployed at home, inside a building, inside a campus, or outdoors. A typical coverage radius of the AP is tens of meters to hundreds of meters. The AP is equivalent to a bridge that connects another network (e.g., a wired network or a cellular mobile network) and the WLAN. The AP is mainly configured to connect wireless network clients to each other, and then connect a wireless network to the Ethernet. Specifically, the AP may be a terminal device or a network device with a WLAN chip.

The non-access point station may be a wireless communication chip, a wireless sensor, or a wireless communication terminal, for example, a mobile phone supporting a WLAN communication function, a tablet computer supporting a WLAN communication function, a set top box supporting a WLAN communication function, a smart TV supporting a WLAN communication function, a smart wearable device supporting a WLAN communication function, an in-vehicle communication device supporting a WLAN communication function, or a computer supporting a WLAN communication function.

Figure 1:
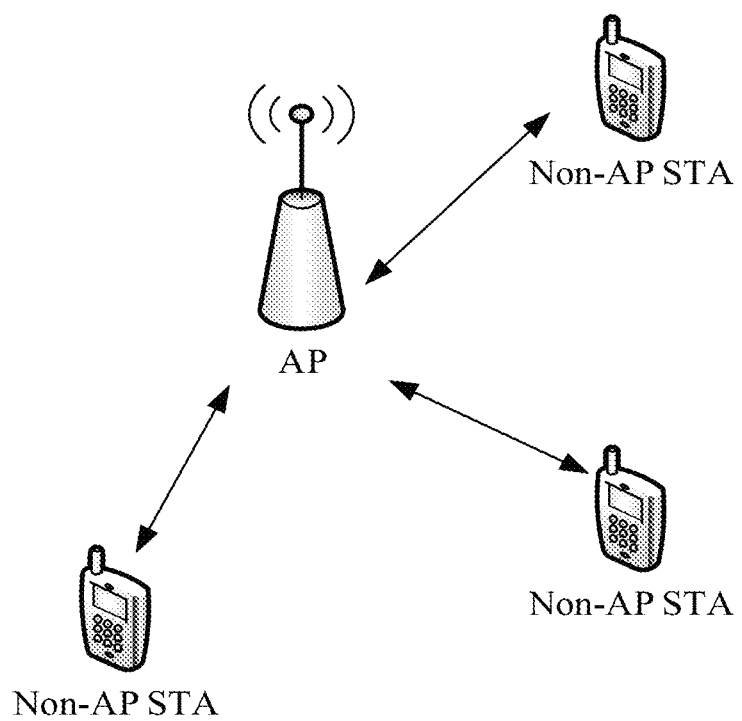
FIG. 1 is a schematic diagram of an architecture of a communication system according to an embodiment of the present disclosure.

For example, embodiments of the present disclosure are applicable to a scenario in which the AP communicates with the non-AP STA in the WLAN. Optionally, the AP may communicate with a single non-AP STA, or the AP communicates with a plurality of non-AP STAs. For example, FIG. 1 is a schematic diagram of an architecture of a communication system according to an embodiment of the present disclosure. FIG. 1 shows one AP and three non-AP STAs.

Each AP and a non-AP STA associated with the AP form a BSS. In an implementation provided in the present disclosure, the access point may be a device configured to communicate with a station. The access point may be any device having a wireless transceiver function or a chip that can be disposed in the device. The device includes but is not limited to: an evolved NodeB (eNB), a radio network controller (RNC), a NodeB (NB), a base station controller (BSC), a base transceiver station (BTS), a home base NodeB (e.g., home evolved NodeB (HNB)), a baseband unit (BBU), an AP, a wireless relay node, a wireless backhaul node, a transmission point (TP), a transmission and reception point (TRP), or the like in a Wi-Fi system, or may be a base station supporting a 5G protocol, or the like. The non-AP STA may be user equipment, an access terminal, a user unit, a mobile station, a mobile console, a remote station, a remote terminal, a mobile device, a user terminal, a terminal, a wireless communication device, a user agent, or a user apparatus. Alternatively, the non-AP STA may be a cellular phone, a cordless phone, a session start protocol (SIP) phone, a station in a wireless local area network, a personal digital processing (PDA), a handheld device with a wireless communication function, a computing device, another processing device connected to a wireless modem, a vehicle-mounted device, a wearable device, a terminal device in a future 5G network, a terminal device in a future evolved public land mobile communications network (PLMN), or the like.

The method provided in the present disclosure may be applied to various communication systems, for example, a WLAN or the Internet of Things (IoT).

Figure 2:
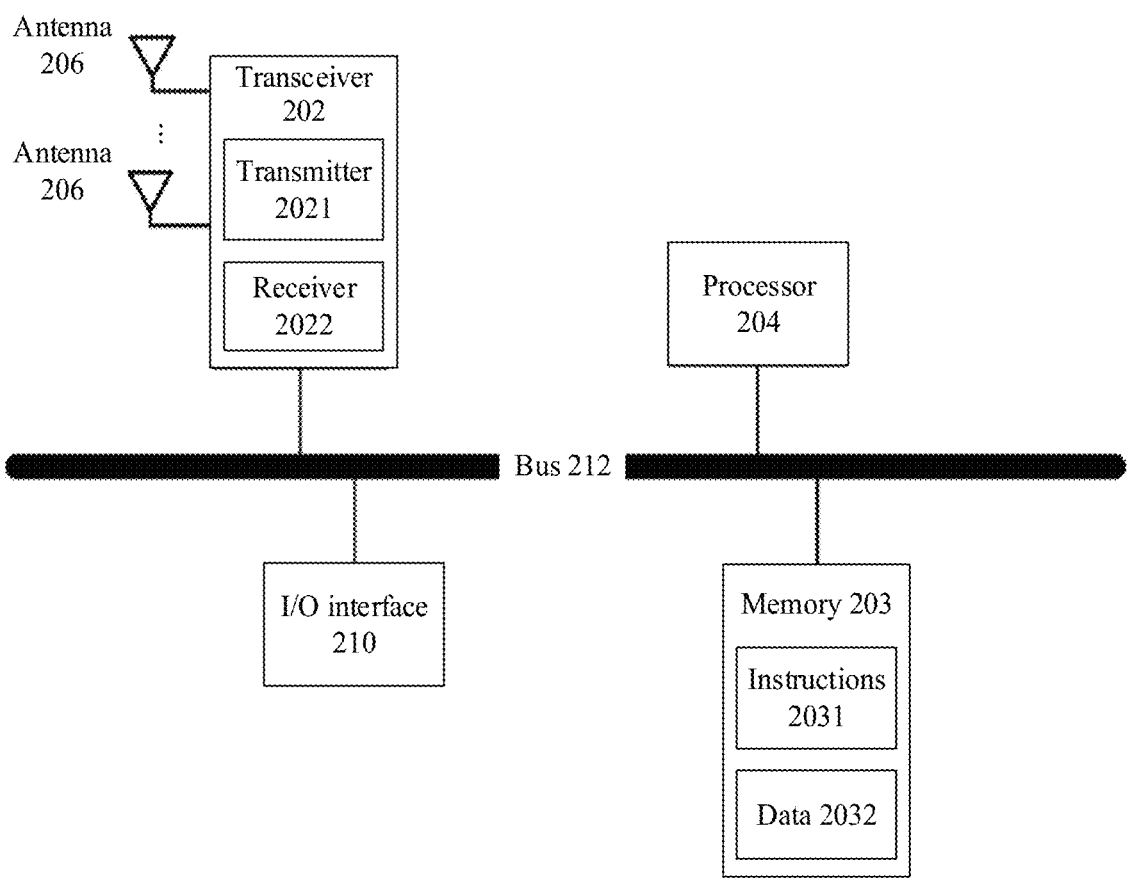
FIG. 2 is a schematic diagram of a hardware structure of a communication apparatus according to an embodiment of the present disclosure.

FIG. 2 is a schematic diagram of a hardware structure of a communication apparatus according to an embodiment of the present disclosure. The communication apparatus may be a possible implementation of the station in embodiments of the present disclosure. As shown in FIG. 2, the communication apparatus includes at least a processor 204, a memory 203, and a transceiver 202. The memory 203 is further configured to store instructions 2031 and data 2032. Optionally, the communication apparatus may further include antennas 206, an input/output (I/O) interface 210, and a bus 212. The transceiver 202 may include a transmitter 2021 and a receiver 2022. In addition, the processor 204, the transceiver 202, the memory 203, and the I/O interface 210 may be communicatively connected to each other through the bus 212, and the antenna 206 is connected to the transceiver 202.

The processor 204 may be a general-purpose processor, for example, but is not limited to a central processing unit (CPU), or may be a dedicated processor, for example, but is not limited to a digital signal processor (DSP), an application-specific integrated circuit (ASIC), and a field programmable gate array (FPGA). Alternatively, the processor 204 may be a neural network processing unit (NPU). In addition, the processor 204 may alternatively be a combination of a plurality of processors. Particularly, in the technical solutions provided in embodiments of the present disclosure, the processor 204 may be configured to perform related steps in subsequent method embodiments. The processor 204 may be a processor that is specially designed to perform the foregoing steps and/or operations, or may be a processor that performs the foregoing steps and/or operations by reading and executing the instructions 2031 stored in the memory 203. The processor 204 may need to use the data 2032 in a process of performing the foregoing steps and/or operations.

The transceiver 202 includes the transmitter 2021 and the receiver 2022. In an optional implementation, the transmitter 2021 is configured to send a signal by using the antenna 206. The receiver 2022 is configured to receive a signal by using at least one of the antennas 206. Particularly, in the technical solutions provided in embodiments of the present disclosure, the transmitter 2021 may be further configured to perform an operation by using at least one of the antennas 206, for example, an operation performed by a receiving module or a sending module in the station when a subsequent method embodiment is applied to the station.

In this embodiment of the present disclosure, the transceiver 202 is configured to support the communication apparatus in performing the foregoing receiving function and sending function. A processor having a processing function is considered as the processor 204. The receiver 2022 may also be referred to as an input port, a receiver circuit, or the like. The transmitter 2021 may be referred to as a transmitter, a transmitter circuit, or the like.

The processor 204 may be configured to execute the instructions stored in the memory 203, to control the transceiver 202 to receive a message and/or send a message, to complete functions of the communication apparatus in the method embodiments of the present disclosure. In an implementation, it may be considered that a function of the transceiver unit 202 is implemented by using a transceiver circuit or a dedicated transceiver chip. In this embodiment of the present disclosure, that the transceiver 202 receives a message may be understood as that the transceiver 202 inputs a message, and that the transceiver 202 sends a message may be understood as that the transceiver 202 outputs a message.

The memory 203 may be various types of storage media, for example, a random-access memory (RAM), a read-only memory (ROM), a non-volatile RAM (NVRAM), a programmable ROM (PROM), an erasable PROM (EPROM), an electrically erasable PROM (EEPROM), a flash memory, an optical memory, and a register. The memory 203 is further configured to store the instructions 2031 and the data 2032. The processor 204 may perform the steps and/or the operations in the method embodiments of the present disclosure by reading and executing the instructions 2031 stored in the memory 203. The data 2032 may need to be used in a process of performing the operations and/or the steps in the method embodiments of the present disclosure.

Optionally, the communication apparatus may further include the I/O interface 210. The I/O interface 210 is configured to receive instructions and/or data from a peripheral device, and output instructions and/or data to the peripheral device.

The following describes some concepts in embodiments of the present disclosure.

1. Beacon Frame

Figure 3:
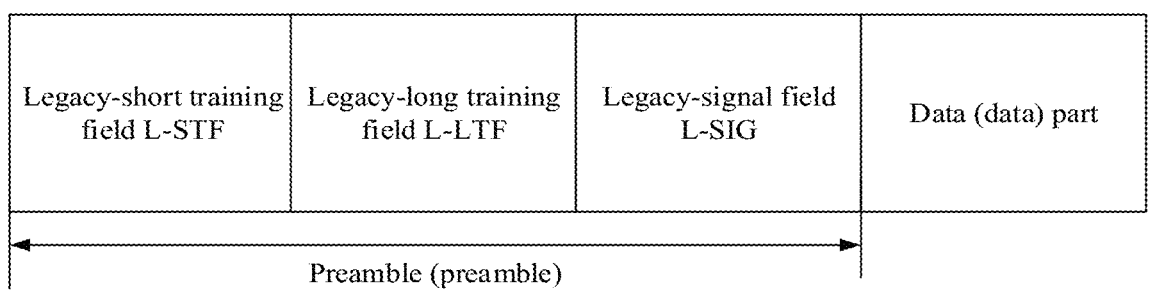
FIG. 3 is a schematic diagram of a structure of a beacon frame.
Figures 4, 5:
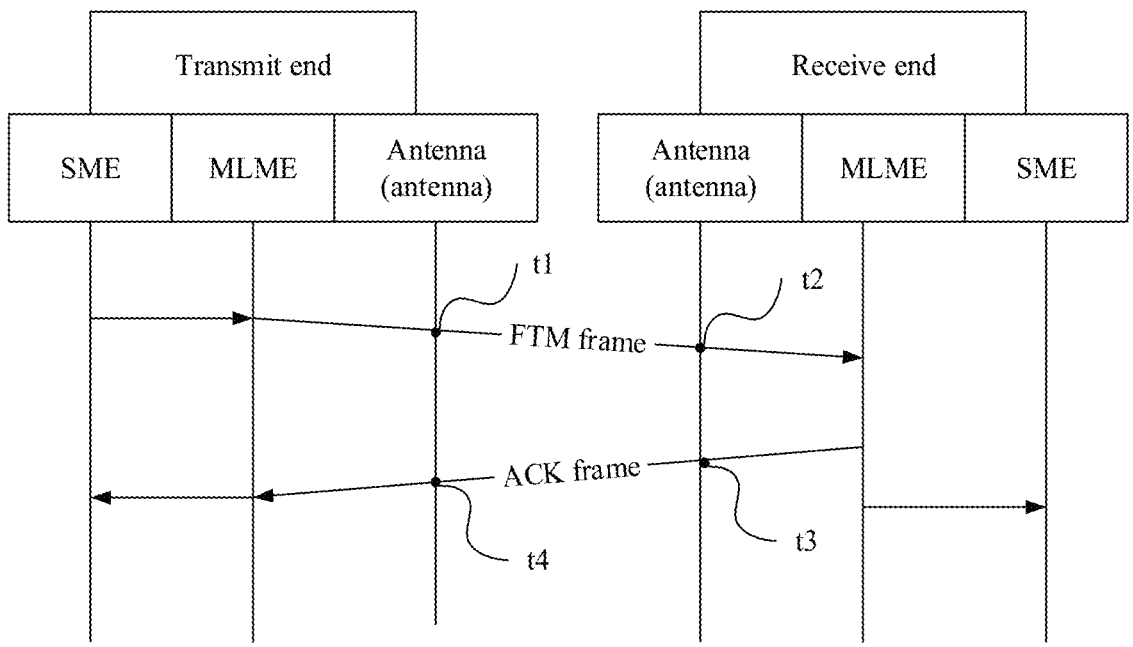
FIG. 4 is a schematic diagram of a structure of a data part in a beacon frame.
FIG. 5 is a flowchart of fine timing measurement.

A beacon frame is a management frame that carries important functions in a BSS system. Specifically, FIG. 3 is a schematic diagram of a structure of a beacon frame. The beacon frame specifically includes a preamble and a data part. The preamble specifically includes an L-STF, an L-LTF, and a legacy-signal field (L-SIG). For the data part, refer to FIG. 4. FIG. 4 is a schematic diagram of a structure of the data part in the beacon frame. Specifically, the data part includes a frame control field, a duration field, an address (address 1, address 2, address 3) field, a sequence control field, a high throughput (HT) control field, a frame body field, and a frame check sequence (FCS).

It should be understood that the beacon frame is merely an example. In a standard formulation process or a technical development process, there may be another structure. This is not limited in the present disclosure.

2. Fine Timing Measurement (FTM)

A data link layer entity in a station may be subdivided into a MAC sublayer and a MAC sublayer management entity (MLME). A physical layer (PHY) may be divided into a PHY sublayer and a PHY sublayer management entity (PLME). A station management entity (SME) in the station manages and controls the behaviour and status of the PHY. Generally, the SME may be a MAC layer.

FTM is used to calculate a clock offset between clocks of different stations. For ease of understanding, refer to FIG. 5. FIG. 5 is a flowchart of fine timing measurement. An FTM process is specifically implemented in a form of an FTM session. An FTM session includes three phases: negotiation, ranging exchange, and termination. In the FTM session, a station that sends an FTM request frame is referred to as a transmit end, and a station that receives the FTM request frame is referred to as a receive end. In the FTM negotiation phase, the transmit end sends an FTM request frame to initiate an FTM session, and the receive end sends an FTM frame for ranging exchange. After receiving the FTM frame, the transmit end sends an ACK frame. Time at which the receive end sends the FTM frame and time at which the receive end receives the ACK frame sent by the transmit end are t1 and t4 respectively, and time at which the transmit end receives the FTM frame and time at which the transmit end sends the ACK frame are t2 and t3 respectively. A clock offset (clock offset) between clocks of the transmit end and the receive end is as follows:

clock offset=$[(t_2-t_1)-(t_3-t_4)]/2$.

It can be learned from the foregoing FTM procedure that, in FTM, a specific FTM packet needs to be transmitted between stations, an FTM session is established through negotiation, and a process is complex. When a network scale is large, air interface overheads are large. Based on this, an embodiment of the present disclosure provides a time calibration method. A first station receives a first frame from a second station. The first station stores a receiving moment of the first frame. The first station receives a second frame from the second station, where the second frame carries a sending moment at which the second station sends the first frame. The first station calculates a clock offset between a clock of the first station and a clock of the second station based on the receiving moment of the first frame and the sending moment of the first frame that are stored by the first station. After receiving the first frame from the second station, the first station stores the receiving moment of the first frame. After receiving the second frame from the second station, the first station may obtain the clock offset between the clock of the first station and the clock of the second station through calculation based on the sending moment of the first frame carried in the second frame and the stored receiving moment of the first frame. Because a distance between the first station and the second station is short, time of air interface transmission between the two stations is very short. Therefore, the second frame sent by the second station does not need to carry the receiving moment of the first frame, and high time calibration precision can still be implemented. In addition, the second station sends the first frame and the second frame to the first station, so that the first station can obtain the clock offset between the clock of the first station and the clock of the second station through calculation. This effectively reduces air interface overheads.

Figure 6:
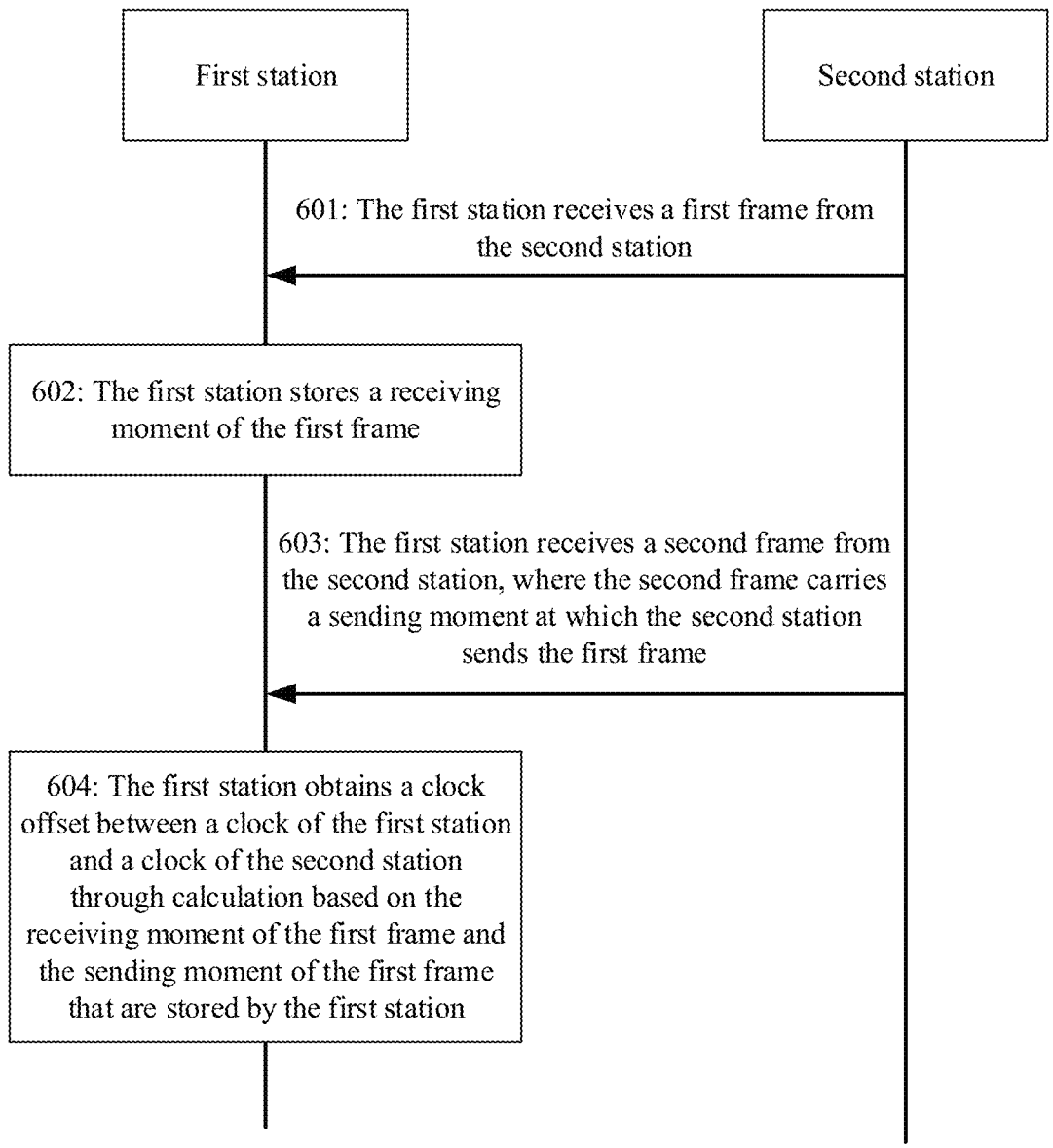
FIG. 6 is a schematic diagram of an embodiment of a time calibration method according to an embodiment of the present disclosure.

Next, FIG. 6 is a schematic diagram of an embodiment of a time calibration method according to an embodiment of the present disclosure. The time calibration method provided in this embodiment of the present disclosure includes the following steps.

601: A first station receives a first frame from a second station.

In this embodiment, the first station receives the first frame from the second station, where the first frame may be a beacon frame or a newly defined management frame. A beacon frame may be a normal beacon frame or a short beacon frame. If this step is implemented by using a beacon frame, no additional management frame is required. In this way, air interface overheads are reduced. If a newly defined management frame is used, the frame can be sent more frequently to complete time calibration in a timelier manner.

Optionally, the first station may be an access point or a non-access point station, and the second station may be an access point or a non-access point station. In this embodiment of the present disclosure, an example in which the first station and the second station are access points is used for description.

When the second station sends the first frame, the second station records a sending moment of the first frame. For example, the second station may record the sending moment of the first frame by using a hardware interrupt. The sending moment of the first frame may be a moment at which the first frame arrives at a digital-to-analog converter (DAC) in the second station. It may be understood that the second station may alternatively record the sending moment of the first frame in another manner, and the sending moment of the first frame may alternatively be a moment at which the first frame arrives at an antenna in the second station. This is not limited in this embodiment of the present disclosure.

Optionally, the first frame may further include an identifier of the second station. The identifier of the second station includes but is not limited to a SSID of the second station, a MAC address of the second station, a BSSID of the second station, or the like.

Optionally, the first frame may further include a sequence number of the first frame.

602: The first station stores a receiving moment of the first frame.

In this embodiment, after receiving the first frame from the second station, the first station records and stores the receiving moment of the first frame. The receiving moment is provided by a local clock of the first station.

Specifically, the receiving moment of the first frame is a moment at which the first frame arrives at a physical layer component of the first station. It may be understood that the receiving moment of the first frame may be a moment at which the first frame arrives at an analog-to-digital converter (ADC) of the first station, or the receiving moment of the first frame may be a moment at which the first frame arrives at an antenna port of the first station, or the like. This is not limited in this embodiment of the present disclosure.

Further, the receiving moment of the first frame is a moment at which a training field in a preamble of the first frame arrives at the physical layer component (e.g., an ADC) of the first station. The training field includes but is not limited to a STF or an L-LTF. If a moment at which an LTF in the preamble arrives at the physical layer is used as the receiving moment, precision of the receiving moment is high. The LTF may be an L-LTF, an HT-LTF, a VHT-LTF, an HE-LTF, an EHT-LTF, or the like.

In a possible implementation, the first station stores the receiving moment of the first frame and the sequence number of the first frame as an association relationship. The sequence number that corresponds to the first frame and that is stored by the first station is a sequence number allocated to the first frame by a sender after the first frame. Usually, a frame sent later by the sender has a larger sequence number (except when the sequence number is cyclic). The sequence number that corresponds to the first frame and that is stored by the first station may alternatively be understood as the sequence number corresponding to the receiving moment of the first frame. For example, the association relationship is shown in Table 1.

TABLE 1

| Receiving moment (day/d, hour/h, minute/m, second/s, microsecond/μs) | Sequence number of the frame |
| --- | --- |
| 00 d'00 h'00 m'01 s'015 μs' | SN1 |

In another possible implementation, the first station stores the receiving moment of the first frame, the sequence number corresponding to the first frame, and the identifier of the second station as an association relationship. The second station is a sender of the first frame, and the identifier of the second station is recorded to distinguish the sender of the first frame. Because there is a very low probability that sequence numbers of frames sent by different stations are the same, the identifier of the second station is not necessary. For example, the association relationship stored by the first station is shown in Table 2.

TABLE 2

| Sequence number corresponding to the first frame | Receiving moment (day/d, hour/h, minute/m, second/s, microsecond/μs) | Identifier of a station that sends the frame |
| --- | --- | --- |
| SN1 | 00 d'00 h'00 m'01 s'015 μs' | BSSID 2 |

603: The first station receives a second frame from the second station, where the second frame carries a sending moment at which the second station sends the first frame.

In this embodiment, the second station sends the second frame after sending the first frame. Correspondingly, the first station receives the second frame from the second station, where the second frame carries the sending moment at which the second station sends the first frame. The sending moment at which the second station sends the first frame is provided by a local clock of the second station.

Further, in a possible implementation, the second frame carries the sequence number corresponding to the first frame. Specifically, when generating the first frame, the second station allocates the corresponding sequence number to the first frame. When generating the second frame, the second station fills the second frame with the sequence number corresponding to the first frame, so that the first station (that is, a receive end) learns of a relationship between the second frame and the first frame.

In another possible implementation, the second frame does not carry the sequence number corresponding to the first frame. In this case, the second frame carries a sequence number corresponding to the second frame.

Figure 7:
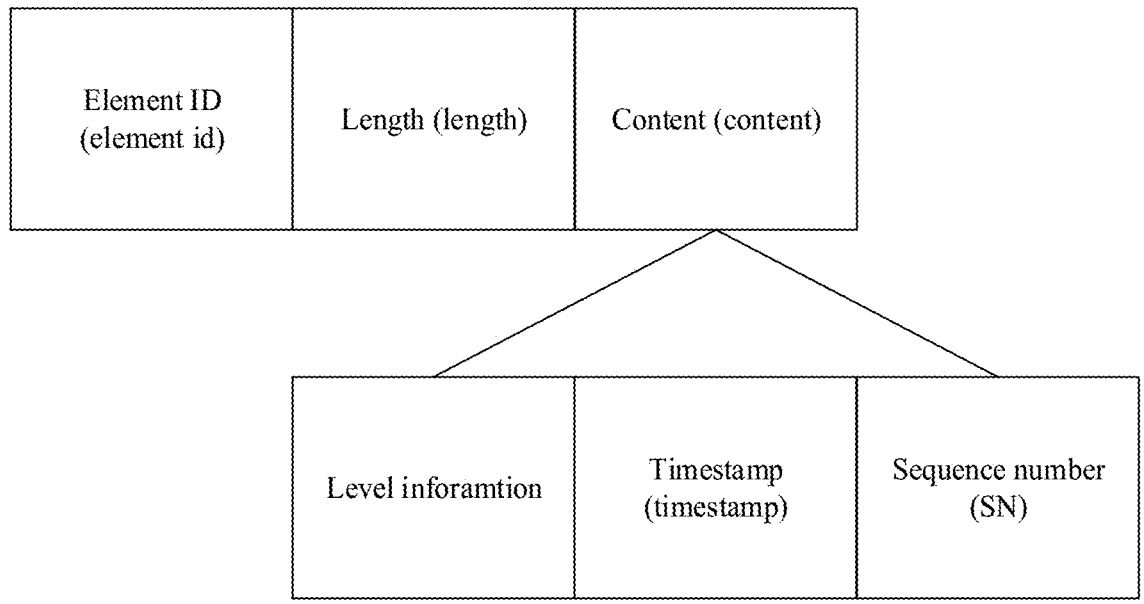
FIG. 7 is a schematic diagram of a structure of a vendor-defined element according to an embodiment of the present disclosure.

For example, the sending moment at which the second station sends the first frame may be carried in a vendor-defined element of the second frame, and the vendor-defined element may be a newly added private element in a beacon frame. For example, FIG. 7 is a schematic diagram of a structure of the vendor-defined element according to an embodiment of the present disclosure. The vendor-defined element includes an element ID, a length, and content. The content includes one or more of the following: level information, a timestamp, and an SN. That is, a "timestamp field" in the vendor-defined element is used to carry the sending moment of the first frame. When the second frame carries the sequence number corresponding to the first frame, a "sequence number field" in the vendor-defined element is used to carry the sequence number corresponding to the first frame. When the second frame does not carry the sequence number corresponding to the first frame, but carries the sequence number corresponding to the second frame, a "sequence number field" in the vendor-defined element is used to carry the sequence number corresponding to the second frame.

Figure 8:
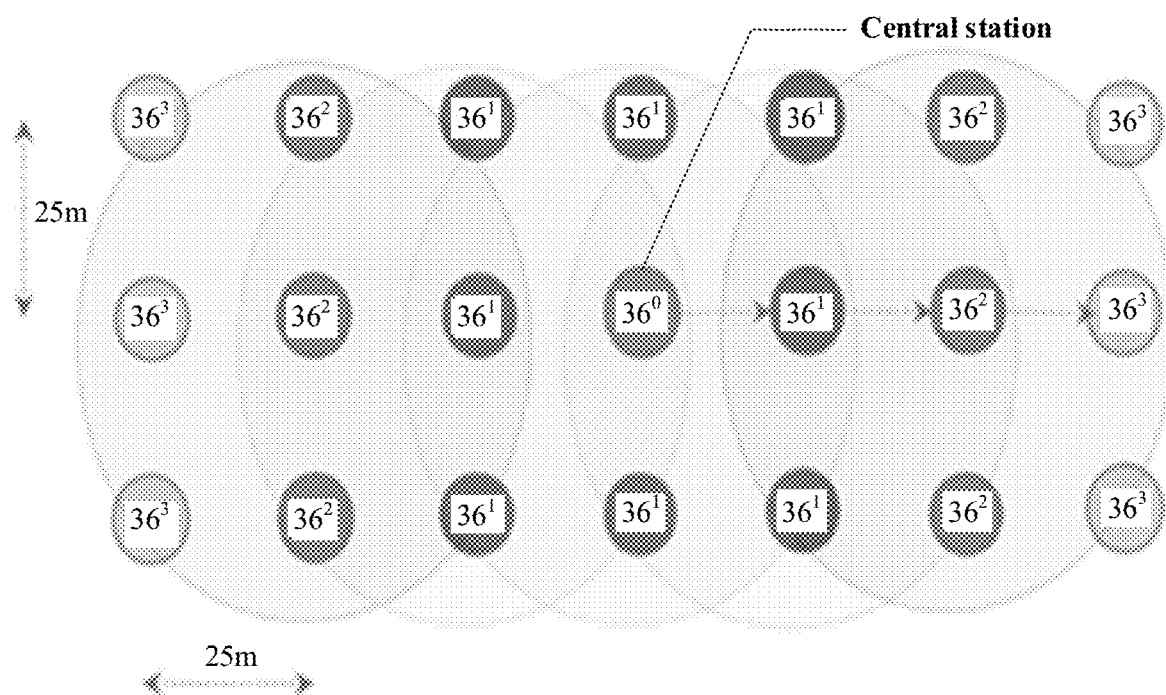
FIG. 8 is a schematic diagram of an application scenario of level information according to an embodiment of the present disclosure.

The "level information" in the vendor-defined element is used to indicate level information of a station sending the frame. For ease of understanding, refer to FIG. 8. FIG. 8 is a schematic diagram of an application scenario of the level information according to an embodiment of the present disclosure. In a possible implementation, a controller (or a server) that manages a plurality of stations determines a central station from the plurality of stations. The central station may be a physical central point of the plurality of stations, or may be manually selected by a user by using the controller. It may be understood that the central station may alternatively be determined by the plurality of stations through negotiation. Level information of the central station indicates that a first frame and a second frame sent by the central station have a highest priority, and another station needs to follow time of the central station based on a timestamp between clocks of the central station and the another station.

For example, in the plurality of stations shown in FIG. 8, a spacing between two stations is 25 meters (m). A station corresponding to the physical central point is selected as the central station. This station has a highest level. For ease of description, a level of the central station is referred to as a level 0, that is, the station 360 in the figure. A neighbouring station of the station is selected as a level 1 station, that is, the station 361 in the figure. The level of the station 360 is higher than the level of the station 361. Therefore, the station 361 follows time of the station 360 based on a clock offset between clocks of the station 361 and the station 360. By analogy, the level of the station 361 is higher than a level of a station 362, and the level of the station 362 is higher than a level of a station 363. A station of a lower level needs to follow time of a station of a higher level. Each station stores level information of the station, and the level information indicates a level of a corresponding station. After receiving a frame from another station (e.g., a station B), a station A determines, based on level information of the frame (that is, level information of the station B) and level information of the station itself (that is, level information of the station A), whether a clock offset between clocks of the station A and the station B needs to be calculated. If a level of the station A is higher than or equal to a level of the station B, no calculation is performed. If a level of the station A is lower than a level of the station B, the station A calculates the clock offset between the clocks of the station A and the station B based on a first frame and a second frame from the station B, and the station A follows time of the station B.

It may be understood that a frame structure of the first frame may be similar to a frame structure of the second frame, that is, the first frame also includes the vendor-defined elements shown in FIG. 7. In this case, a "timestamp field" in the first frame is empty. Optionally, a "sequence number field" of the first frame is filled with a sequence number corresponding to the first frame.

Further, the second station sends a plurality of frames to the first station. The 1st frame in the plurality of frames is used as the first frame, and a frame other than the first frame is used as the second frame. A sending sequence in which the second station sends the plurality of frames is used as a reference. A "timestamp field" in the 1st second frame carries the sending moment of the first frame, and a "timestamp field" in a second frame sent subsequently carries a sending moment of the second frame sent last time. Optionally, a "sequence number field" in a second frame later sent carries a sequence number of a second frame sent last time.

For example, the second station sends five frames to the first station, including a frame 1, a frame 2, a frame 3, a frame 4, and a frame 5. A "timestamp field" of the frame 1 is empty, a "timestamp field" of the frame 2 carries a sending moment of the frame 1, a "timestamp field" of the frame 3 carries a sending moment of the frame 2, a "timestamp field" of the frame 4 carries a sending moment of the frame 3, and a "timestamp field" of the frame 5 carries a sending moment of frame 4. A "sequence number field" of the frame 1 is empty, a "sequence number field" of the frame 2 is filled with a sequence number of the frame 1, a "sequence number field" of the frame 3 is filled with a sequence number of the frame 2, a "sequence number field" of the frame 4 is filled with a sequence number of the frame 3, and a "sequence number field" of the frame 5 is filled with a sequence number of the frame 4.

604: The first station obtains a clock offset between a clock of the first station and a clock of the second station through calculation based on the receiving moment of the first frame and the sending moment of the first frame that are stored by the first station.

In this embodiment, because the first station and the second station belong to different stations in a WLAN, and a distance between the different stations in the WLAN is short, a transmission delay generated between the different stations due to the distance is small. In other words, time of air interface transmission between the different stations can be ignored. Based on this, a time difference obtained by the first station by subtracting the sending moment of the first frame from the receiving moment of the first frame that are stored in the first station may be considered as the clock offset between the clock of the first station and the clock of the second station.

Specifically, there are different implementations depending on whether the second frame carries the sequence number corresponding to the first frame. Details are as follows.

In a possible implementation, when the second frame carries the sequence number corresponding to the first frame, after the first station receives the second frame from the second station, the first station searches, based on the sequence number of the first frame carried in the second frame, for the receiving moment of the first frame corresponding to the sequence number of the first frame. After the first station finds the receiving moment of the first frame, the first station obtains the clock offset between the clock of the first station and the clock of the second station through calculation based on the receiving moment of the first frame and the sending moment of the first frame that are stored by the first station. For example, the first station calculates the clock offset between the clock of the first station and the clock of the second station based on the receiving moment (the receiving moment is stored when the first station receives the first frame) of the first frame and the sending moment (the sending moment is carried in the second frame) of the first frame that are stored by the first station.

Specifically, each time after receiving a frame, the first station stores a receiving moment of the frame and stores a sequence number corresponding to the receiving moment. After the first station receives the second frame, the first station locally searches, based on the sequence number of the first frame carried in the second frame, for a local sequence number (that is, a sequence number locally stored in the first station) that is the same as the sequence number. If the local sequence number exists, a receiving moment corresponding to the local sequence number is the receiving moment of the first frame.

For example, after the first station receives the frame 1, the first station records and stores a receiving moment "T1" of the frame 1 and the sequence number "1" of the frame 1. After the first station receives the frame 2, the frame 2 carries the sequence number "1" (that is, the sequence number of the frame 1). The first station searches for a local sequence number based on the sequence number "1" carried in the frame 2. After the first station finds that a same sequence number "1" exists locally, the first station determines that a receiving moment corresponding to the local sequence number "1" is the receiving moment of the frame 1.

In another possible implementation, if the second station sets the sequence number in a manner of adding 1 to each frame, the second frame may not carry the sequence number corresponding to the first frame. For example, a sequence number of a next beacon frame is usually increased by one compared with a sequence number of a previous beacon frame. In this case, each frame may include only a sequence number of the frame, that is, the first frame carries the sequence number of the first frame, and the second frame carries the sequence number of the second frame. In this implementation, after the first station receives the second frame from the second station, the first station obtains the sequence number of the second frame. The first station obtains the sequence number of the first frame by subtracting one from the sequence number of the second frame. Then, the first station searches for the corresponding receiving moment of the first frame based on the sequence number of the first frame. After the first station finds the receiving moment of the first frame, the first station obtains the clock offset between the clock of the first station and the clock of the second station through calculation based on the receiving moment of the first frame and the sending moment of the first frame that are stored by the first station. For example, the first station calculates the clock offset between the clock of the first station and the clock of the second station based on the receiving moment (the receiving moment is stored when the first station receives the first frame) of the first frame and the sending moment (the sending moment is carried in the second frame) of the first frame that are stored by the first station.

Specifically, each time after receiving a frame, the first station stores a receiving moment of the frame and stores a sequence number corresponding to the receiving moment. After the first station receives the second frame, the first station obtains the sequence number of the first frame by subtracting one from the sequence number of the second frame carried in the second frame. Then, the first station locally searches for whether a local sequence number (that is, a sequence number locally stored in the first station) that is the same as the sequence number exists. If the local sequence number exists, a receiving moment corresponding to the local sequence number is the receiving moment of the first frame.

For example, after the first station receives the frame 1, the first station records and stores a receiving moment "T1" of the frame 1 and the sequence number "1" of the frame 1. After the first station receives the frame 2, the frame 2 carries the sequence number "2" (that is, the sequence number of the frame 2). The first station obtains the sequence number "1" of the frame 1 by subtracting one from the sequence number "2" carried in the frame 2. The first station then searches for the local sequence number. After the first station finds that a same sequence number "1" exists locally, the first station determines that a receiving moment corresponding to the local sequence number "1" is the receiving moment of the frame 1.

It may be understood that, after receiving the second frame, the first station does not find the receiving moment corresponding to the first frame based on the sequence number of the first frame carried in the second frame or the sequence number of the first frame obtained by subtracting one from the sequence number of the second frame carried in the second frame. The first station considers that a frame loss occurs between the first frame and the second frame. For example, the first station receives the frame 5, and a sequence number carried in the frame 5 is "4" (that is, the sequence number of the frame 4). The first station searches, based on the sequence number "4" carried in the frame 5, for a receiving moment of the frame 4 corresponding to "4". When the receiving moment of the frame 4 corresponding to "4" is not found, the first station considers that a frame loss occurs in the frame 4. In other words, the first station fails to receive the frame 4.

After the first station determines that a frame loss occurs, the first station may search, based on a sequence number in a new received frame, for a receiving moment corresponding to the sequence number. Then, the first station calculates the clock offset between the clock of the first station and the clock of the second station based on a locally stored receiving moment (which is considered as the receiving moment of the first frame) and a sending moment (which is considered as the sending moment of the first frame) carried in the new received frame.

Alternatively, after the first station determines that a frame loss occurs, the first station may search, based on a sequence number in a new received frame, for a receiving moment corresponding to the sequence number. After the first station receives n new received frames and finds corresponding receiving moments based on sequence numbers of the n new received frames, the first station obtains the clock offset between the clock of the first station and the clock of the second station through calculation based on a receiving moment and a sending moment of the nth new received frame, where n is a positive integer. For example, after the first station determines that a frame loss occurs, the first station continuously receives five new received frames, and the first station locally finds corresponding receiving moments based on sequence numbers in the five received frames. The first station obtains the clock offset between the clock of the first station and the clock of the second station through calculation based on a sending moment carried in the 5th received frame and a local receiving moment corresponding to the 5th received frame.

Figure 9:
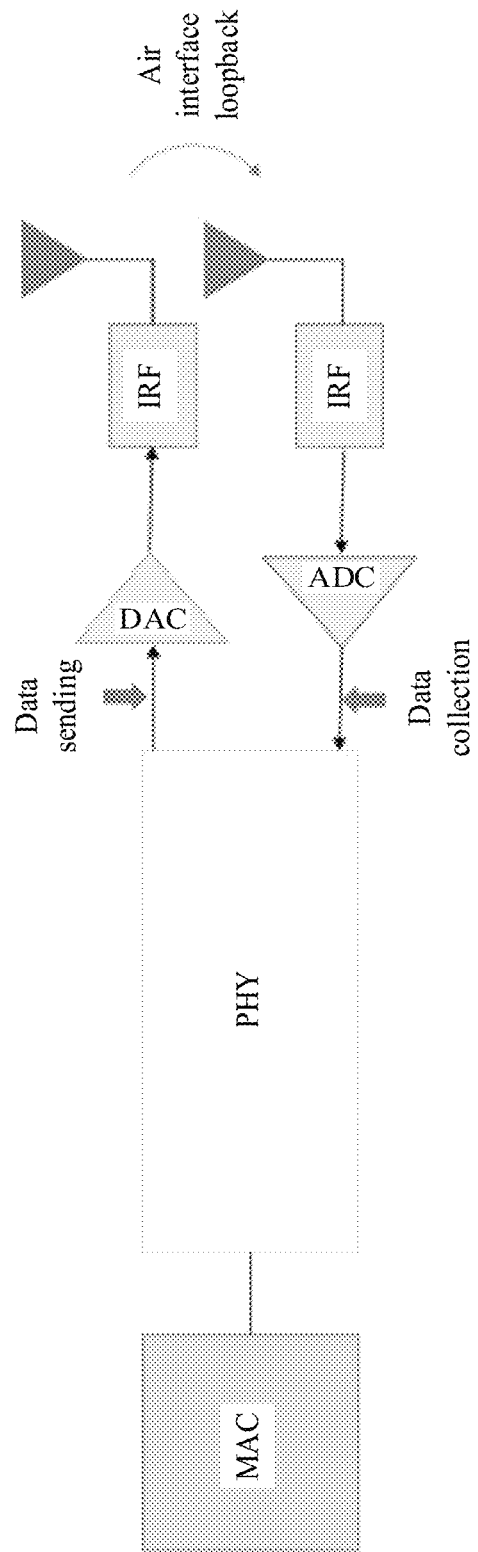
FIG. 9 is a schematic diagram of a method for obtaining a hardware time delay according to an embodiment of the present disclosure.

Optionally, the first station may obtain a hardware time delay of the first station, and then calibrate the foregoing calculated clock offset between the clock of the first station and the clock of the second station based on the hardware time delay, to improve precision of the clock offset between the clocks of the first station and the second station. FIG. 9 is a schematic diagram of a method for obtaining the hardware time delay according to an embodiment of the present disclosure. A station shown in FIG. 9 includes at least two radio frequency (intermediate radio frequency (IRF)) channels. The station selects one of the radio frequency channels as a sending channel, and records a data sending timestamp (denoted as data sending or ts1) at which data arrives at a DAC. After the data is transmitted through an antenna of the sending channel, the data is received by an antenna of a receive channel, and an air interface closed loop of the data is implemented. After the data arrives at an ADC of the receive channel, a data collection timestamp (recorded as data collection or ts2) is recorded. The station calculates the hardware time delay (tdly) based on ts1 and ts2. The calculation method is as follows: tdly=ts2−ts1. Further, a method for calibrating the foregoing calculated clock offset between the clock of the first station and the clock of the second station by the first station based on the hardware time delay is as follows: clock offset between the clock of the first station and the clock of the second station=receiving moment of the first frame—sending moment of the first frame—hardware time delay.

Optionally, the first frame and/or the second frame further include/includes first level information, and the first level information indicates a level of the second station. After receiving the first frame and/or the second frame, the first station obtains the first level information included in the first frame and/or the second frame. The first station obtains second level information that indicates a level of the first station. Then, the first station compares the first level information with the second level information. When the level of the second station is higher than the level of the first station, the first station follows (follow) time of the second station based on the clock offset between the clock of the first station and the clock of the second station. In this way, each station follows a clock offset between a clock of the station and a clock of a station with a higher level, to ensure accuracy of the calculated clock offset between the clocks.

Optionally, the first station may further measure a distance between the first station and the second station, and then compensate for the clock offset between the clock of the first station and the clock of the second station based on the distance, to further improve accuracy of the clock offset.

In a possible implementation, after the first station obtains the clock offset between the clock of the first station and the clock of the second station through calculation, the first station may perform time calibration based on the clock offset. For example, the first station follows the clock of the second station.

In another possible implementation, after the first station obtains the clock offset between the clock of the first station and the clock of the second station through calculation, the first station does not perform time calibration based on the clock offset. The first station may determine, based on a requirement of actual application (application), a purpose of the clock offset and an occasion for using the clock offset. For example, a server managing the first station and the second station needs to collect information about a plurality of frames from the first station and the second station, and determine interference information about a plurality of stations based on information about the plurality of frames. The first station obtains the clock offset between the clock of the first station and the clock of the second station through calculation by using the foregoing method, and the first station reports the clock offset to the server, so that the server learns of the clock offset between the clock of the first station and the clock of the second station. The server calibrates information about a frame from the first station and information about a frame from the second station based on the clock offset, to ensure accuracy of information about a frame.

An embodiment of the present disclosure provides a time calibration method. A first station receives a first frame from a second station. The first station stores a receiving moment of the first frame. The first station receives a second frame from the second station, where the second frame carries a sending moment at which the second station sends the first frame. The first station calculates a clock offset between a clock of the first station and a clock of the second station based on the receiving moment of the first frame and the sending moment of the first frame that are stored by the first station. After receiving the first frame from the second station, the first station stores the receiving moment of the first frame. After receiving the second frame from the second station, the first station may obtain the clock offset between the clock of the first station and the clock of the second station through calculation based on the sending moment of the first frame carried in the second frame and the stored receiving moment of the first frame. Because a distance between the first station and the second station is short, time of air interface transmission between the two stations is very short. Therefore, the second frame sent by the second station does not need to carry the receiving moment of the first frame, and high time calibration precision can still be implemented. In addition, the second station sends the first frame and the second frame to the first station, so that the first station can obtain the clock offset between the clock of the first station and the clock of the second station through calculation. This effectively reduces air interface overheads.

Figure 10:
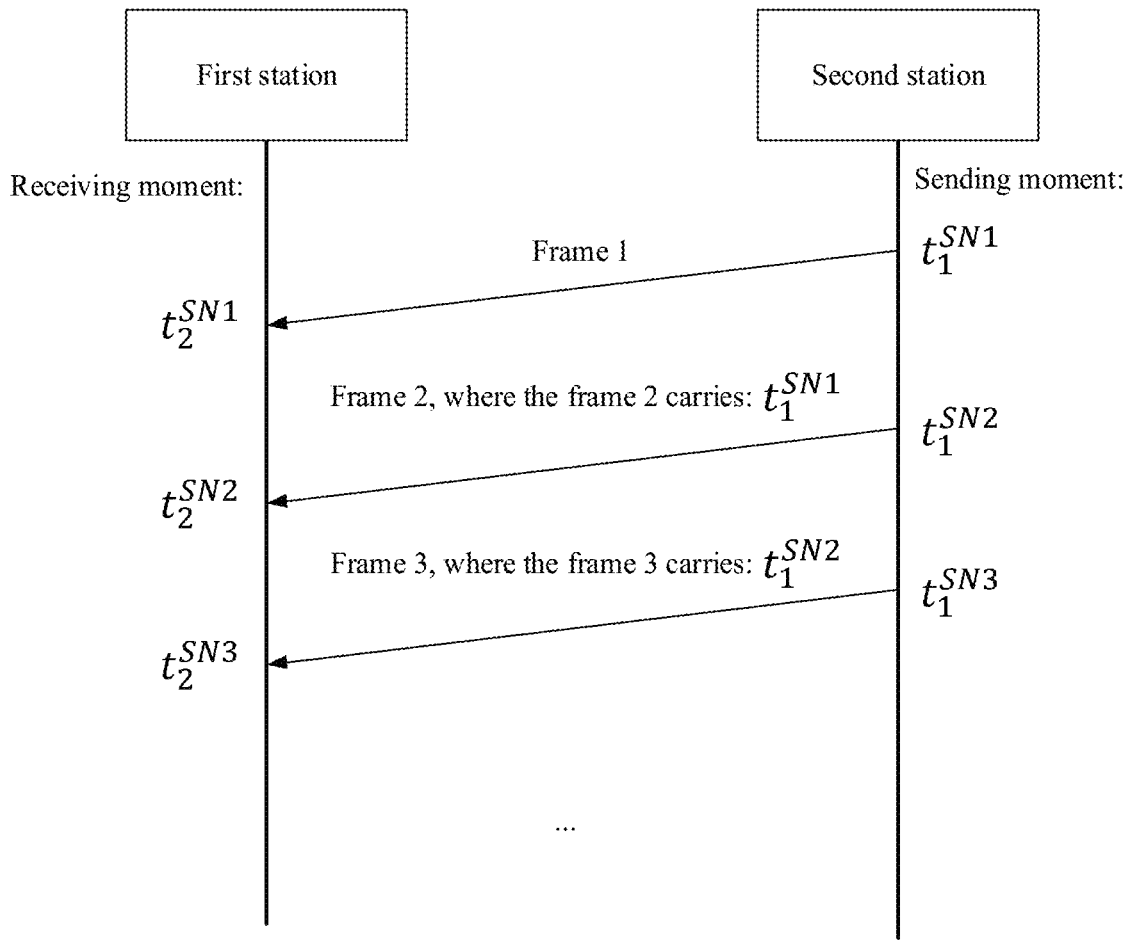
FIG. 10 is a schematic diagram of an application scenario according to an embodiment of the present disclosure.

The following describes an application scenario according to an embodiment of the present disclosure with reference to the foregoing embodiment. FIG. 10 is a schematic diagram of the application scenario according to an embodiment of the present disclosure. The application scenario includes a first station and a second station. The second station sends a plurality of frames such as a frame 1, a frame 2, and a frame 3 to the first station (when the frame 1 is used as the 1st frame, the frame 2 is used as the 2nd frame; when the frame 2 is used as the 1st frame, the frame 3 is used as the 2nd frame; and so on). A sending moment of the frame 1 in the second station is $t_1^{SN1}$, and a receiving moment of the frame 1 in the first station is $t_2^{SN1}$. A sending moment of the frame 2 in the second station is $t_1^{SN2}$, a receiving moment of the frame 2 in the first station is $t_2^{SN2}$, and the frame 2 carries the sending moment $t_1^{SN1}$ of the frame 1. The first station calculates a clock offset between clocks of the first station and the second station based on $t_2^{SN1}$ and $t_1^{SN1}$. A sending moment of the frame 3 in the second station is $t_1^{SN3}$, a receiving moment of the frame 3 in the first station is $t_2^{SN3}$, and the frame 3 carries the sending moment $t_1^{SN2}$ of the frame 2. The first station calculates the clock offset between the clocks of the first station and the second station based on $t_2^{SN2}$ and $t_1^{SN2}$. By analogy, the first station continuously calculates and updates the clock offset between the clock of the first station and the clock of the second station based on a plurality of frames from the second station, to ensure precision of the clock of the first station. Optionally, a time interval at which the second station sends two adjacent frames (e.g., the frame 1 and the frame 2, or the frame 2 and the frame 3) may be equal to target beacon frame transmission time (target beacon transmission time, TTBT). Optionally, a time interval at which the second station sends two adjacent frames (e.g., the frame 1 and the frame 2, or the frame 2 and the frame 3) may be less than TTBT, to improve clock precision. Optionally, a time interval at which the second station sends two adjacent frames (e.g., the frame 1 and the frame 2, or the frame 2 and the frame 3) may be greater than TTBT, to reduce occupation of air interface resources.

The foregoing mainly describes the solutions provided in embodiments of the present disclosure from the perspective of the methods. It can be understood that, to implement the foregoing functions, a communication apparatus includes corresponding hardware structures and/or software modules for performing the functions. A person of ordinary skill in the art should easily be aware that, in combination with the examples described in embodiments disclosed in this specification, modules, algorithms and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

In embodiments of the present disclosure, the communication apparatus may be divided into function modules based on the foregoing method examples. For example, each function module may be obtained through division based on each function, or two or more functions may be integrated into one processing module. The integrated module may be implemented in a form of hardware, or may be implemented in a form of a software functional module. It should be noted that, in embodiments of the present disclosure, module division is an example, and is merely a logical function division. In actual implementation, another division manner may be used.

Figure 11:
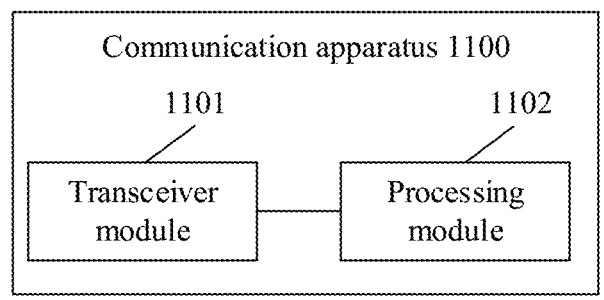
FIG. 11 is a schematic diagram of an embodiment of a communication apparatus according to an embodiment of the present disclosure.

The following describes in detail a communication apparatus in the present disclosure. FIG. 11 is a schematic diagram of an embodiment of the communication apparatus according to an embodiment of the present disclosure. The communication apparatus may be deployed in a first station. A communication apparatus 1100 includes: a transceiver module 1101 configured to receive a first frame from a second station; and a processing module 1102 configured to store a receiving moment of the first frame.

The transceiver module 1101 is further configured to receive a second frame from the second station, where the second frame carries a sending moment at which the second station sends the first frame.

The processing module 1102 is further configured to obtain a clock offset between a clock of the first station and a clock of the second station based on the receiving moment of the first frame and the sending moment of the first frame that are stored by the first station.

In a possible implementation, the processing module 1102 is further configured to store a sequence number of the first frame.

In a possible implementation, the processing module 1102 is further configured to store an identifier of the second station in the first frame.

In a possible implementation, the second frame further carries a sequence number of the first frame. The communication apparatus further includes:

The processing module 1102 is further configured to search, based on the sequence number of the first frame carried in the second frame, for the receiving moment of the first frame corresponding to the sequence number of the first frame.

In a possible implementation, the second frame further carries a sequence number of the second frame. The communication apparatus further includes:

The processing module 1102 is further configured to subtract one from the sequence number of the second frame to obtain the sequence number of the first frame, and search for the receiving moment of the first frame corresponding to the sequence number of the first frame.

In a possible implementation, the second station is an access point, and the first frame and the second frame are beacon frames.

In a possible implementation, the receiving moment of the first frame is a moment at which the first frame arrives at a physical layer component in the first station.

In a possible implementation, the receiving moment of the first frame is a moment at which a training field in a preamble of the first frame arrives at the physical layer component in the first station.

In a possible implementation, the processing module 1102 is further configured to obtain the clock offset between the clock of the first station and the clock of the second station through calculation based on a hardware time delay of the first station, the receiving moment of the first frame, and the sending moment of the first frame.

In a possible implementation, the first frame and/or the second frame further include/includes first level information, and the first level information indicates a level of the second station.

The transceiver module 1101 is further configured to obtain second level information, where the second level information indicates a level of the first station.

The processing module 1102 is further configured to: when the level of the second station is higher than the level of the first station, follow time of the second station based on the clock offset between the clock of the first station and the clock of the second station.

In a possible implementation, the sending moment of the first frame is located in a vendor-defined element of the second frame.

All related content of the steps in the foregoing method embodiments may be cited in function descriptions of the corresponding functional modules. Details are not described herein again.

In this embodiment, the communication apparatus 1100 is presented in a form of functional modules obtained through integration. The module herein may be an ASIC, a circuit, a processor that executes one or more software or firmware programs, a memory, an integrated logic circuit, and/or another component capable of providing the foregoing functions.

Because the communication apparatus 1100 provided in this embodiment may perform the foregoing time calibration method, for technical effects that can be achieved by the communication apparatus 1100, refer to the foregoing method embodiments. Details are not described herein again.

The communication apparatus in the foregoing embodiment may be a station, or may be a chip applied to a station, or another combined device, component, or the like that can implement a function of the foregoing station. When the communication apparatus is a station, the transceiver module (including a sending module and a receiving module) may be a transceiver. The transceiver may include an antenna, a radio frequency circuit, and the like. The processing module may be a processor, for example, a baseband chip. When the communication apparatus is a component that has a function of the station, the transceiver module may be a radio frequency unit, and the processing module may be a processor. When the communication apparatus is a chip system, the receiving module may be an input port of the chip system, the sending module may be an output interface of the chip system, and the processing module may be a processor of the chip system, for example, a CPU.

An embodiment of the present disclosure further provides a computer-readable storage medium, including instructions. When the instructions are run on a computer, the computer is enabled to control a station to perform any implementation shown in the foregoing method embodiment.

The embodiment of the present disclosure further provides a computer program product. The computer program product includes computer program code, when the computer program code is run on a computer, the computer is enabled to perform any implementation shown in the foregoing method embodiment.

Further, an embodiment of the present disclosure further provides a computer program product. When the computer program product runs on a computer device or a station, the computer device or the station is enabled to perform any implementation shown in the foregoing method embodiments.

An embodiment of the present disclosure further provides a chip system, including a processor and an interface circuit. The interface circuit is configured to receive instructions and transmit the instructions to the processor. The processor is configured to implement the method in any one of the foregoing method embodiments.

Optionally, the chip system further includes a memory, and there may be one or more processors in the chip system. The processor may be implemented by using hardware, or may be implemented by using software. When the processor is implemented by using hardware, the processor may be a logic circuit, an integrated circuit, or the like. When the processor is implemented by using software, the processor may be a general-purpose processor, and the method in any one of the foregoing method embodiments is implemented by reading software code stored in the memory.

Optionally, there may also be one or more memories in the chip system. The memory may be integrated with the processor, or may be separate from the processor. This is not limited in the present disclosure. For example, the memory may be a non-transitory memory, for example, ROM. The memory and the processor may be integrated in a same chip, or may be separately disposed on different chips. A type of the memory and a manner of disposing the memory and the processor are not specifically limited in the present disclosure.

The foregoing describes the embodiments of the present disclosure in detail. Steps in the methods in the embodiments of the present disclosure may be sequentially scheduled, combined, or deleted according to an actual requirement. Modules in the apparatus in the embodiments of the present disclosure may be divided, combined, or deleted according to an actual requirement.

It should be understood that "one embodiment" or "an embodiment" mentioned in the entire specification means that particular features, structures, or characteristics related to embodiments are included in at least one embodiment of the present disclosure. Therefore, "in one embodiment" or "in an embodiment" appearing throughout the specification does not necessarily refer to a same embodiment. In addition, these particular features, structures, or characteristics may be combined in one or more embodiments by using any appropriate manner. It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of embodiments of the present disclosure.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in embodiments of the present disclosure, "B corresponding to A" indicates that B is associated with A, and B may be determined according to A. However, it should be further understood that determining B based on A does not mean that B is determined based only on A. B may alternatively be determined based on A and/or other information.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present disclosure, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, functional units in embodiments of the present disclosure may be integrated into one processing unit, each of the units may exist alone physically, or two or more units may be integrated into one unit. The integrated unit may be implemented in a form of hardware, or may be implemented in a form of a software function unit.

The invention claimed is:

1. A method implemented by a first station for obtaining a clock offset between a first clock of the first station and a second clock of a second station, the method comprising:
   receiving a first frame from the second station without establishing a fine timing measurement (FTM) session between the first station and the second station, wherein the first frame comprises a first sequence number;
   storing the first sequence number and a receiving moment of the first frame;
   receiving a second frame from the second station, wherein the second frame comprises a second sequence number and a sending moment at which the second station sends the first frame;
   retrieving the receiving moment based on the second sequence number; and
   obtaining a clock offset between a first clock of the first station and a second clock of the second station based on the receiving moment and the sending moment.

2. The method according to claim 1, wherein the second sequence number is the same as the first sequence number.

3. The method according to claim 2, further comprising storing an identifier of the second station.

4. The method according to claim 2, wherein retrieving the receiving moment based on the second sequence number comprises searching for the receiving moment corresponding to the second sequence number.

5. The method according to claim 1, wherein the second sequence number is greater than the first sequence number by one, and wherein retrieving the receiving moment based on the second sequence number comprises:
   subtracting one from the second sequence number to obtain the first sequence number; and
   searching for the receiving moment corresponding to the first sequence number.

6. The method according to claim 1, wherein the second station is an access point, and wherein the first frame and the second frame are beacon frames.

7. The method according to claim 1, wherein the receiving moment is when the first frame arrives at a physical layer component in the first station.

8. The method according to claim 1, wherein the receiving moment is when a training field in a preamble of the first frame arrives at a physical layer component in the first station.

9. The method according to claim 1, wherein obtaining the clock offset comprises obtaining the clock offset between the first clock and the second clock through calculation based on a hardware time delay of the first station, the receiving moment, and the sending moment.

10. The method according to claim 1, wherein the first frame and/or the second frame further comprise/comprises first level information indicating a first level of the second station, and wherein the method further comprises:
    obtaining second level information indicating a second level of the first station; and
    following time of the second station based on the clock offset when the first level is higher than the second level.

11. The method according to claim 6, wherein the sending moment of the first frame is located in a vendor-defined element of the second frame.

12. A first station comprising:
    a memory configured to store instructions; and
    one or more processors coupled to the memory and configured to execute the instructions to cause the first station to:
      receive a first frame from a second station without establishing a fine timing measurement (FTM) session between the first station and the second station, wherein the first frame comprises a first sequence number;
      store the first sequence number and a receiving moment of the first frame;
      receive a second frame from the second station, wherein the second frame comprises a second sequence number and a sending moment at which the second station sends the first frame;
      retrieve the receiving moment based on the second sequence number; and
      obtain a clock offset between a first clock of the first station and a second clock of the second station based on the receiving moment and the sending moment.

13. The first station according to claim 12, wherein the second station is an access point, and the first frame and the second frame are beacon frames.

14. The first station according to claim 12, wherein the receiving moment is when the first frame arrives at a physical layer component in the first station.

15. The first station according to claim 12, wherein the receiving moment is when a training field in a preamble of the first frame arrives at a physical layer component in the first station.

16. The first station according to claim 12, wherein the first frame and/or the second frame further comprise/comprises first level information indicating a first level of the second station, and wherein the one or more processors are is further configured to execute the instructions to cause the first station to:
    obtain second level information indicating a second level of the first station; and
    follow time of the second station based on the clock offset when the first level is higher than the second level.

17. The first station according to claim 12, wherein the second sequence number is the same as the first sequence number.

18. The first station according to claim 17, wherein the one or more processors are further configured to execute the instructions to cause the first station to retrieve the receiving moment based on the second sequence number by searching: for the receiving moment corresponding to the second sequence number.

19. The first station according to claim 17, wherein the second sequence number is greater than the first sequence number by one, and wherein the one or more processors are further configured to execute the instructions to cause the first station to retrieve the receiving moment based on the second sequence number by:
    subtracting one from the second sequence number to obtain the first sequence number; and
    searching for the receiving moment corresponding to the first sequence number.

20. A non-transitory computer-readable storage medium storing program code, the program code comprising instructions, which when executed using a one or more processors of a first station cause the first station to:
    receive a first frame from a second station without establishing a fine timing measurement (FTM) session between the first station and the second station, wherein the first frame comprises a first sequence number;

store the first sequence number and a receiving moment of the first frame;

receive a second frame from the second station, wherein the second frame comprises a second sequence number and a sending moment at which the second station sends the first frame;

retrieve the receiving moment based on the second sequence number; and obtain a clock offset between a first clock of the first station and a second clock of the second station based on the receiving moment and the sending moment.

\* \* \* \* \*

UNITED STATES PATENT AND TRADEMARK OFFICE
CERTIFICATE OF CORRECTION

PATENT NO. : 12,445,983 B2
APPLICATION NO. : 17/963348
DATED : October 14, 2025
INVENTOR(S) : Le Niu et al.

Page 1 of 1

It is certified that error appears in the above-identified patent and that said Letters Patent is hereby corrected as shown below:

In the Claims

Claim 16, Column 26 Lines 34-35: "processors are is further configured" should read "processors are further configured"

Claim 18, Column 26 Lines 46-47: "by searching: for the" should read "by searching for the"

Signed and Sealed this
Ninth Day of December, 2025

John A. Squires
*Director of the United States Patent and Trademark Office*